Aug. 26, 1969   L. C. BERARDI ET AL   3,463,641
PROCESS FOR PRODUCING COMPRESSED DRY FOOD AND PRODUCT
Filed Oct. 13, 1965   2 Sheets-Sheet 1

INVENTOR
LEAH C. BERARDI ET AL

BY
/ATTORNEYS

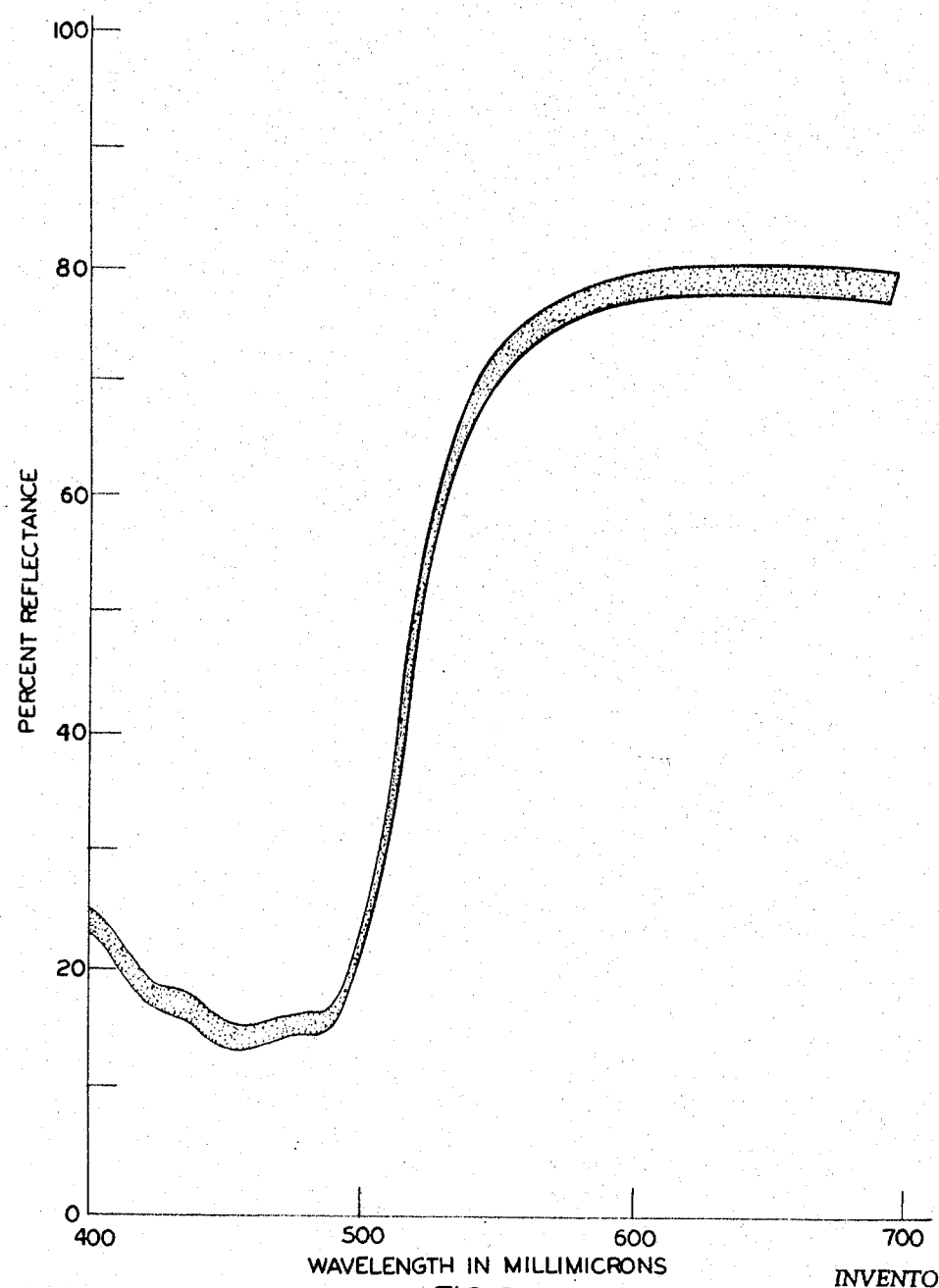

3,463,641
PROCESS FOR PRODUCING COMPRESSED DRY FOOD AND PRODUCT
Leah C. Berardi, Wilda H. Martinez, and Gordon J. Boudreaux, New Orleans, and Biagio Piccolo and Vernon L. Frampton, Metairie, La., assignors to the United States of America as represented by the Secretary of Agriculture
Filed Oct. 13, 1965, Ser. No. 495,735
Int. Cl. A23p 1/00; B65b 31/00, 55/00
U.S. Cl. 99—1     4 Claims

ABSTRACT OF THE DISCLOSURE

A disk of dried food material is produced having smooth reproducible surfaces for measuring its color objectively. The dry food is prepared in the form of a sandwich comprising outer layers of plastic and an inner layer of dried food product. The system is evacuated at less than 50 mm. Hg for 1 to 5 minutes, then compressed at about 300 to 3000 p.s.i.g. for 5 to 30 seconds.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to an improved process for producing smooth uniform disks of relatively dry food products and to the product so produced. More specifically, it deals with a rapid, reproducible method for measuring objectively the colors of relatively dry food products. By the process, human errors are eliminated.

As used herein, the term "food products" includes proteins, carbohydrates, and lipid-containing (fat) materials. Typical examples of food products include lyophilized egg yolks; lyohilized egg whites; lyophilized peanut butter; precooked, flaked, dehydrated Irish potatoes; dry gelatin dessert mix; "instant" ground coffee; dried ground sassafras leaves; pancake flour with shortening; dried skim milk; dried whole milk; dehulled, flaked cottonseed meats; dehulled flaked soybean meats; cornmeal; and the like. These will be discussed more fully below.

The term "relatively dry" relates to products which have been naturally or artificially dried and contain usually from about 2 to 4% moisture and, in certain instances, contain from about 2 to 12% moisture.

The term "lyophilized" relates to "free-drying" as applied to various food products particularly those containing lipid components.

A rapid, objective, and reproducible method for measuring objectively the colors of dried foods has long been a problem in the food industry. One of the methods used has been termed the "subjective" method wherein visual comparisons are made using the product under investigation and visually comparing its color against a control. This method has several disadvantages. In the first place, the "controls" of certain products such as egg yolks and many other lipid-containing compounds have a short shelf-life; in the second place, any differences in the visual sensitivity (color blindness) among a panel of observers may negate the results of the tests; in the third place, no standardized conditions of viewing, such as controlled lighting, have been developed. Consequently, this "subjective" method has failed to give reliable results.

Another method which has been employed is the "chemical" method. This method is laborious, time-consuming, and presently known chemical methods do not measure completely many types of pigments such as the pigments in eggs.

The third method which has been suggested may be termed an "objective" method, that is, one in which the color may be determined analytically, as by means of a spectrophotometer. Such a procedure was developed for determining the color of cotton fibers, by compressing (pressing) the fibers into flat disks between metallic plates and comparing the color of the sample against a control. However, this method has not been applicable to food products. In the first place, food products, especially those containing lipid components (or fats) tend to stick to the metallic surfaces of a die (or press) and the disk crumbles; in the second place, the surface of the compressed food product is not uniform and color measurements obtained from various spots on the surface give different results; in the third place, disks reproduced from the *same* sample of food product give different results. This is particularly true with food products which contain appreciable quantities of fatty material; in the fourth place, the formation of the disk from dry egg yolks by compression between steel surfaces in a pressure cylinder causes the extrusion of some colored lipid components which separate from the remainder of the compressed food. Thus, it is seen that there is a real need for an objective method for preparing disks useful for color assay of dried foods. Such a method should be simple, rapid, and easily carried out in commercially available pressure equipment; it should produce a smooth, uniform, reproducible surface from a relatively dry raw or processed food material; it should be applicable to food materials having a low, medium, or high fat content, as well as to food material containing high, medium, or low contents of protein and carbohydrates; it should be useful for subsequent rapid and objective measurement of the color of the food product; the disks should not be physically distorted during removal from the compression chamber; last, but most important, the disks from the same sample of food material should be reproducible.

We have now found that by preparing the dry food product in the form of a sandwich, the outer layers of which are a plastic material and the inner layer is the dried food product, evacuating the system to a pressure less than about 50 mm. mercury, maintaining a period of dwell under the vacuum, and subsequently applying pressure to the sandwich, it is possible to obtain a disk of food material having smooth, reproducible surfaces in a remarkably simple, rapid, and efficient manner.

In order that the process of our invention may be fully understood, reference is made to the following detailed description and to the accompanying drawings in which:

FIGURE 3 shows the Reflectance Spectral Curves of 15 disks prepared with the same sample of lyophilized egg yolks. These curves show the reproducibility of disks prepared by the process of our invention and have a standard deviation of ±0.108 in the Hue, a standard deviation of ±0.037 in the Value, and a standard deviation of ±0.304 in the Chroma of their psychophysical surface colors.

THE DIE OR COMPRESSION UNIT

Figure 1:
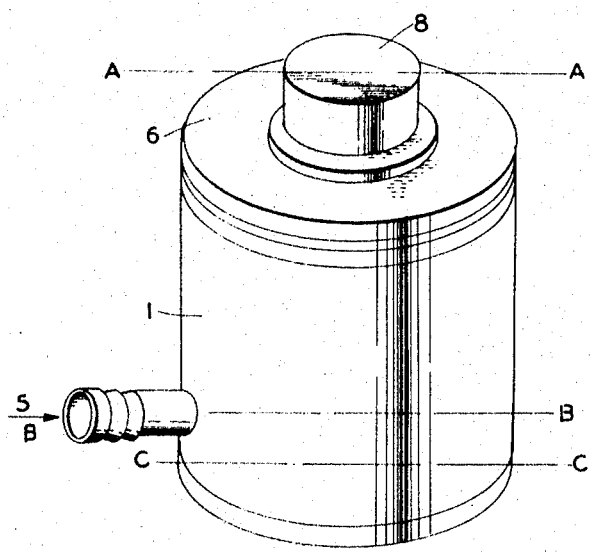
FIGURE 1 is a pictorial view of the die (press or pressing device)
Figure 2:
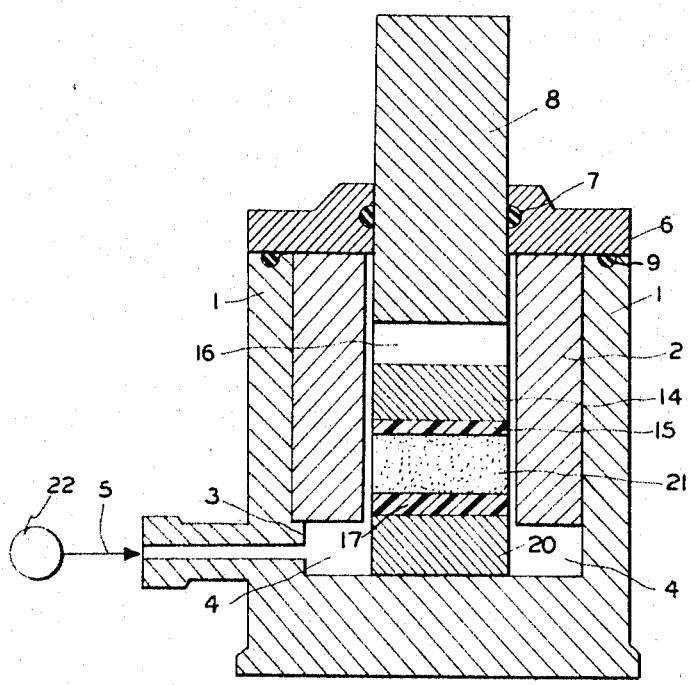
FIGURE 2 is a section view through plane AABBCC of FIGURE 1, showing the construction of the parts of the press and the sandwich.

The die, or compression unit, comprising a housing, an inner cylinder, an opening, or bore, in the inner cylinder, and the moving parts that pass through the bore are shown in FIGURE 2. Number 1 is a circular housing enclosing removable cylinder 2 which is supported by a circular inset 3 located near the bottom of the housing. This inset provides an open space 4 between cylinder 2 and the bottom of housing 1 which open space is connected to vacuum pump 22 by means of vent 5. Through this vent open space 4 may be evacuated. Housing 1 also supports a removable top 6 which is recessed to hold flexible circular gasket 7 which fits snugly against plunger 8 and prevents passage of air during the operation of the vacuum system. Housing 1 also has an annular depression holding gasket 9 which serves as a seal between the housing and the removable top when the interior 4 is evacuated. The interior sidewalls of cylinder 2 and removable housing-top 6 are in exact alignment and permit unobstructed movement of plunger 8, which in turn contacts metallic disk 14. Metallic disk 14 in turn contacts plastic disk 15, which forms the upper layer of the sandwich. Metallic disk 20 rests on the bottom of housing 1 and has a thickness greater than the vertical height of open space 4, thereby sealing the inner opening of bore 16 of cylinder 2. Plastic disk 17, which forms the lower layer of the sandwich rests upon metallic disk 20. Dry food products 21 which form the interior of the sandwich are situated between plastic disks 15 and 17.

PREPARATION OF A DRY FOOD DISK

As a practical demonstration of the operation of the apparatus, removable top 6, plunger 8, both metallic disks 14 and 20 and both plastic disks 15 and 17 are removed from the inner cylinder 2. Metallic disk 20 is then inserted in bore 16 of inner cylinder 2, plastic disk 17 is then inserted, and (for experimental purposes) about 0.7 to 1.5 grams dry food product 21 placed on the top of plastic disk 17. By careful manipulation, practically no dry food product adheres to the side of bore 16. If the dry food product resting on plastic disk 17 is not uniformly positioned, it is brushed lightly to give uniform distribution over the surface of the plastic disk 17. Plastic disk 15 is then gently lowered onto the upper surface of the dried food product. Metallic disk 14 is then entered after which removable top 6 holding plunger 8 is attached.

Vacuum pump 22 is then attached to orifice 5 and the pressure of inner chamber 4 reduced to less than 50 mm. Hg, preferably about 1–5 mm. Hg, and held for 1–5 minutes. This period of dwell is a *critical* feature of the process of our invention, particularly upon the reproducibility of the color of disks taken from the same sample of dry food product.

Following the period of dwell under vacuum, pressure is applied to plunger 8, while still maintaining the vacuum, and the pressure is held for about 5 to 30 seconds. The pressure is then released and air is gradually introduced through orifice 5 into the evacuated cylinder.

The disk of compressed food material is then recovered in sandwich form and may be handled as follows: when the disk is to be used for color measurement, the disk is retained in sandwich form until the analyst is ready to make the measurement at which time one of the plastic disks is removed. The other plastic disk helps to reinforce the disk of dry food and helps to eliminate possible damage by breakage prior to or during measurement, particularly if it is a thin food disk. When the disks of compressed dry food are to be packaged, both plastic disks are removed from the recovered sandwich and the compressed food product is packaged for the particular purpose desired.

It is an advantage of the dry food disks prepared by the process of our invention that they may be wrapped (packaged) and moved from place to place without damage.

It is a further advantage of the food disks prepared by the process of our invention that they have excellent shelf life, are less bulky, are less susceptible to microbial growth than the same bulky dry food prior to pressing, have long shelf life, can be packaged in wrappings which prevent damage by confused flour beetles as may happen to bulky carbohydrate foods, and the compressed foods may be easily reconstituted.

It is a still further advantage that when one or both of the plastic layers are removed, the surface of the food disk is smooth, uniform, and free from pits caused by a portion of the food-disk adhering to the plastic disk. This was unexpected especially when food products containing lipid components, such as egg yolks, are pressed.

It is a still further advantage of the disks prepared by the process of our invention that they are reproducible in smoothness of surface as well as in color. Thus, FIGURE 3 exemplifies the closeness in color of 15 disks prepared from a single sample of dried egg yolks in 15 consecutive pressings and has a deviation of about 2% which cannot be distinguished by the human eye. The average or mean value of the phychophysical surface colors of the 15 disks, in terms of the Munsell system, is: Hue, 3.35; Value, 8.28; and Chroma, 8.75. In terms of the Munsell system, the standard deviation for Hue among all 15 disks is $\pm 0.108$; the standard deviation for Value among all 15 disks is $\pm 0.037$; and the standard deviation for Chroma among all 15 disks is $\pm 0.304$. These differences are not visually distinguishable.

The colors of disks produced by the process of our invention are easily and rapidly determined by means of a General Electric Type Recording Spectrophotometer by processes well known to color analysts. With a machine such as the spectrophotometer mentioned above, a complete analysis of the color of a disk may be completed in about two minutes. Most important, the result is objective and the possibility of human error is substantially eliminated.

As noted above, various food types may be used, the three general classes being rich in carbohydrates, proteins and fats, or mixtures thereof.

Proteins as used herein include products such as

| | |
|---|---|
| Soybean protein isolates | Casein (dried) |
| Soybean whey | Leaf proteins |
| Soybean meal | Zein |
| Cottonseed meal | Sorghum gluten meal |
| Microbial proteins | Rice polish |
| Proteins from algae | Dried fermentation |
| Dehydrated chopped liver | solubles |
| Dehydrated, chopped or ground beef | Babassu meal |
| | Linseed oil meal |
| Fish meal | Rapeseed oil meal |
| Cottonseed flour | Sunflower seed meal |
| Soybean flour | Sesame meal |
| Soybean meal grits | Dehydrated tofu |
| Dried egg whites | |

Carbohydrates include

| | |
|---|---|
| Coffee (ground) | Chocolate fudge |
| Tea (ground) | Dry, ground cocoa |
| Dehydrated orange juice concentrate | Bread crumbs |
| | Wheat meal |
| Dehydrated grapefruit juice concentrate | Buckwheat meal |
| | Dehydrated hydrol |
| Starch | Chick-pea meal |
| Degermed or whole corn meal | Lupine meal |
| | Leaf meal |
| Corn meal grits | Alfalfa meal |
| Dried peas, split | Palm kernel meal |
| White, brown or converted rice | Dried dessert mixes |
| | Dehydrated jams and jellies |
| Cane, maple, beet, white or brown sugar | Cocoanut oil meal |
| Cooked, flaked carrots | Dried whole milk |
| Dehydrated, flaked apples | Dried skim milk |
| Dried, cooked Irish potato flakes | Flaked cottonseed |
| | Flaked soybeans |
| Dehydrated, precooked sweetpotato flakes | |

Foods containing lipid components include

| | |
|---|---|
| Dried egg yolks | Dry cake mixes with high-fatty contents |
| Ground bitter chocolate | |
| Peanuts | Dried, chopped olives |
| Lyophilized, smooth-type peanut butter | Full-fat fish meal |
| | Full-fat soybean meal |
| Pecans | Full-fat cottonseed meal |
| Walnuts | Full-fat peanut meal |
| Dehydrated, processed cheeses | |

The particular plastic employed will depend to some extent upon the dried food product to be pressed. For proteins and/or carbohydrates polyethylene and polypropylene films may be used. For foods containing lipid components, such as egg yolks, we prefer disks of polymerized tetrafluoroethylene. Regardless of the particular plastic employed, it is a *critical* feature of the process of our invention that the plastic disk be shaped to fit into the bore of the press. It should be smooth and free of scratches or nicks which might be detrimental to obtaining smooth surfaces on the pressed food disks. It is also *critical* that the plastic disk fit snugly into the bore of the cylinder to avoid slippage sideways under pressure. For larger cylinders larger plastic disks are required and the thickness of such a plastic disk should be such as to reduce, or eliminate, fracture during handling.

As noted above, the vacuum should be less than about 50 mm. Hg, preferably 1–5 mm. Hg, and a period of dwell maintained for about 1–5 minutes. Pressures may vary from about 300 to 3,000 pounds per square inch gage (p.s.i.g.) and the time of pressing may range from about 5 to 30 seconds. It was *unexpected* that a satisfactory disk could be obtained under such low pressures for so short a time.

When the pressed dry food is to be used for some purpose other than reproduced color measurements, a similar period of dwell under vacuum prior to pressing is a good practice.

In the following examples the process and results of this invention are described in greater detail. As noted above, "lyophilized" means "freeze dried." However, the precooked, dehydrated sweet potato and the Irish potato flakes listed in the table in Example 2 were heat dried.

Example 1

In this example, a 0.7 gram sample of lyophilized egg yolks is placed on the bottom disk which is prepared from polymerized tetrafluoroethylene. The upper tetrafluoroethylene disk is then placed on top of the dried food after the latter had been brushed easily to give a uniform thickness, the two disks and the layer of dried egg yolks forming the ingredients of the sandwich. The upper metallic disk, plunger, and removable top are then inserted as noted above, and the vacuum pump connected to the orifice. When the vacuum has been reduced to about 25 mm. Hg, a period of dwell is held for two minutes, after which a pressure of 320 p.s.i.g. is applied for 5 seconds. The pressure is then released, the vacuum released, and the sandwich now in disk form is removed from the cylinder.

Example 2

The procedure of Example 1 is repeated 14 times using in each case a sample of the same lyophilized egg yolk used in Example 1.

The 15 disks were then analyzed by means of reflectance measurements vs. magnesium carbonate blocks using a General Electric Type Recording Spectrophotometer. The reflectance measurements were recorded and are shown in FIGURE 3.

It will be noted from these curves that there is only a slight difference in the reflectance value of these 15 curves, the actual difference in value being 0.166% reflectance units at all wave lengths measured (400 to 700 millimicrons). This difference would be indistinguishable to the human eye.

Example 3

In this example, various dried food products are formed into disks using various periods of dwell after the vacuum has been reduced to less than 5 mm. Hg. The results follow:

| Dry food | Amount of dry food for disk (grams) | Preliminary evacuation period (minutes) | Pressing load (pounds per square inch) | Total pressing period (seconds) |
|---|---|---|---|---|
| Lyophilized egg yolks | 0.7 | 2 | 320 | 5 |
| Lyophilized egg whites | 0.7 | 5 | 640 | 5 |
| Lyophilized peanut butter | 1.8 | 4 | 640 | 15 |
| Precooked, dehydrated sweet potato flakes | 1.4 | 2 | 1,792 | 15 |
| Dry gelatin dessert mix | 1.0 | 2 | 2,048 | 10 |
| "Instant," ground coffee | 1.0 | 2 | 2,048 | 25 |
| Dried, ground sassafras leaves | 1.0 | 2 | 2,048 | 5 |
| Pancake flour with added shortening | 1.5 | 2 | 320 | 5 |
| Dried skim milk | 1.5 | 1 | 480 | 20 |
| Dehulled, flaked cottonseed meats | 0.7 | 4 | 314 | 25 |
| Corn meal | 1.5 | 2 | 1,792 | 5 |
| Cooked, dried Irish potato flakes | 1.5 | 2 | 2,560 | 52 |

In every instance, a smooth, uniform surface is obtained, and products such as the dried sweet potato disks and dried skim milk disks are easily reconstituted in hot water.

Example 4

In the following example, a large sample (15 grams) of the precooked, dehydrated sweet potato flakes are pressed. The period of dwell at a vacuum of 2 mm. Hg is 2 minutes and a pressure of 1,792 p.s.i.g. disk area is applied for 15 seconds. The resultant pressed disk is smooth, free from pits and, when packaged in a wrapping which does not permit light to penetrate (aluminum foil) the packaged disk has good shelf life. When the packaged compressed product is a carbohydrate, it is free from attack by "confused flour beetles."

We claim:

1. In a process for forming by compression between metallic surfaces, smooth, uniform disks from relatively dry food products, the improvement consisting of inserting a sandwich between the metallic surfaces, said sandwich consisting of outer layers of a plastic material selected from the group consisting of polyethylene, polypropylene, and polymerized tetrafluoroethylene and an inner layer of the food product, said outer layers being inert to said inner layer, conducting said compression in a range from about 300 to 3000 pounds per square inch gage under vacuum of less than 50 mm. Hg for a period of from 1 to 5 minutes and thereafter recovering the disk of food product.

2. A process according to claim 1 wherein a period of dwell is maintained under said vacuum for at least 1 minute prior to the application of external pressure to the food product.

3. A process according to claim 2 wherein the pressure applied to the plastic surface in contact with the food product ranges from about 300 to 3,000 pounds per square inch gage.

4. A process according to claim 1 wherein the plastic material is polymerized tetrafluoroethylene.

References Cited

UNITED STATES PATENTS 3,328,587    6/1967    Brown et al. _____ 250—218

MAURICE W. GREENSTEIN, Primary Examiner

U.S. Cl. X.R.

23—230; 99—56, 66, 199, 210; 107—18; 356—173